United States Patent

Munyon

[11] Patent Number: 5,393,267
[45] Date of Patent: Feb. 28, 1995

[54] ADJUSTABLE COUPLED DRIVE SHAFT WITH A RESTRAINING RING

[75] Inventor: Robert E. Munyon, Columbia, Md.

[73] Assignee: Kop-Flex, Inc., Baltimore, Md.

[21] Appl. No.: 32,702

[22] Filed: Mar. 17, 1993

Related U.S. Application Data

[63] Continuation of Ser. No. 655,624, Feb. 15, 1991, abandoned.

[51] Int. Cl.6 ............................................. F16D 3/18
[52] U.S. Cl. ................................. 464/156; 464/159
[58] Field of Search ............. 464/156, 158, 159, 147, 464/16, 7, 154, 155, 901

[56] References Cited

U.S. PATENT DOCUMENTS

| | | | |
|---|---|---|---|
| 1,641,668 | 9/1927 | Fast | 464/16 |
| 1,770,743 | 7/1930 | Morgan | 464/16 |
| 2,964,929 | 12/1960 | Hoffman | 464/156 |
| 3,070,979 | 1/1963 | Shipley et al. | 464/154 |
| 3,138,010 | 6/1964 | Shipley et al. | 464/158 |
| 3,475,043 | 10/1969 | Anderson | 464/158 |
| 3,620,046 | 11/1971 | Wenzel et al. | 464/33 |
| 3,898,813 | 8/1975 | Calistrat | 464/158 |
| 4,443,205 | 4/1984 | Grant | 464/156 |
| 4,472,160 | 9/1984 | Wright | 464/156 |
| 4,990,121 | 2/1991 | Vosheck et al. | 464/159 |

FOREIGN PATENT DOCUMENTS 55-94027  7/1980  Japan ................................. 464/156

*Primary Examiner*—Daniel P. Stodola
*Assistant Examiner*—Eileen A. Dunn
*Attorney, Agent, or Firm*—Cushman, Darby & Cushman

[57] ABSTRACT

A coupling for driving and driven shafts has a first sleeve mounted for axial sliding on the curved teeth of a spool sleeve to accomodate variation of distances between such shafts; oil dam rings are located to provide abutment stops to prevent axial shifting of the sleeves in one arrangement of the sleeves.

12 Claims, 2 Drawing Sheets

ADJUSTABLE COUPLED DRIVE SHAFT WITH A RESTRAINING RING

This is a continuation of application Ser. No. 07/655,624, filed on Feb. 15, 1991, now abandoned.

BACKGROUND OF THE INVENTION

1. Field of the Invention

The present invention relates to couplings for transmission of torque from a drive shaft to a driven shaft. More specifically, the present invention relates to a coupling, the axial dimension of which is adjustable.

2. Background Information

Two different types of couplings are presently being used to connect a gas turbine driver to various driven machines. Where the driven machine has a thrust bearing, the coupling connecting the gas turbine to the driven machine must allow for significant axial movement of the shaft on the driven machine. A "slide" type coupling is therefore conventionally used so that the axial dimension of the coupling will change and allow the driven shaft to move axially. In contrast, where the driven machine does not involve a thrust bearing, a "limited end float" type coupling is conventionally used. This type of coupling serves to restrict axial movement of the shaft being driven. Accordingly, when a gas turbine driver is to be disconnected from a driven machine with a thrust bearing and connected to another driven machine without a thrust bearing, the coupling attached to the gas turbine driver must be disconnected and replaced with another coupling. The same is true when a driven machine without a thrust bearing is to be replaced with a driven machine with a thrust bearing. Again couplings must be interchanged.

SUMMARY OF THE INVENTION

The present invention solves the problem existing in prior art couplings. A single coupling is disclosed which can be used in both applications. The coupling comprises at least three parts, a spool and two sleeves. If a limited end float type coupling is needed, a retaining ring is snapped into an accomodating recess in the sleeve. This retaining ring serves as an abutment member to limit relative axial movement of two parts. If a slide type coupling is needed, the retaining ring is removed and increased relative axial movement is possible. The same sleeve and spool can therefore be used in both applications.

BRIEF DESCRIPTION OF THE DRAWINGS

Other features of the invention will become more fully apparent from the following detailed description of the preferred embodiments, the appended claims, and the accompanying drawings in which:

DETAILED DESCRIPTION OF THE PREFERRED EMBODIMENTS

Figure 1:
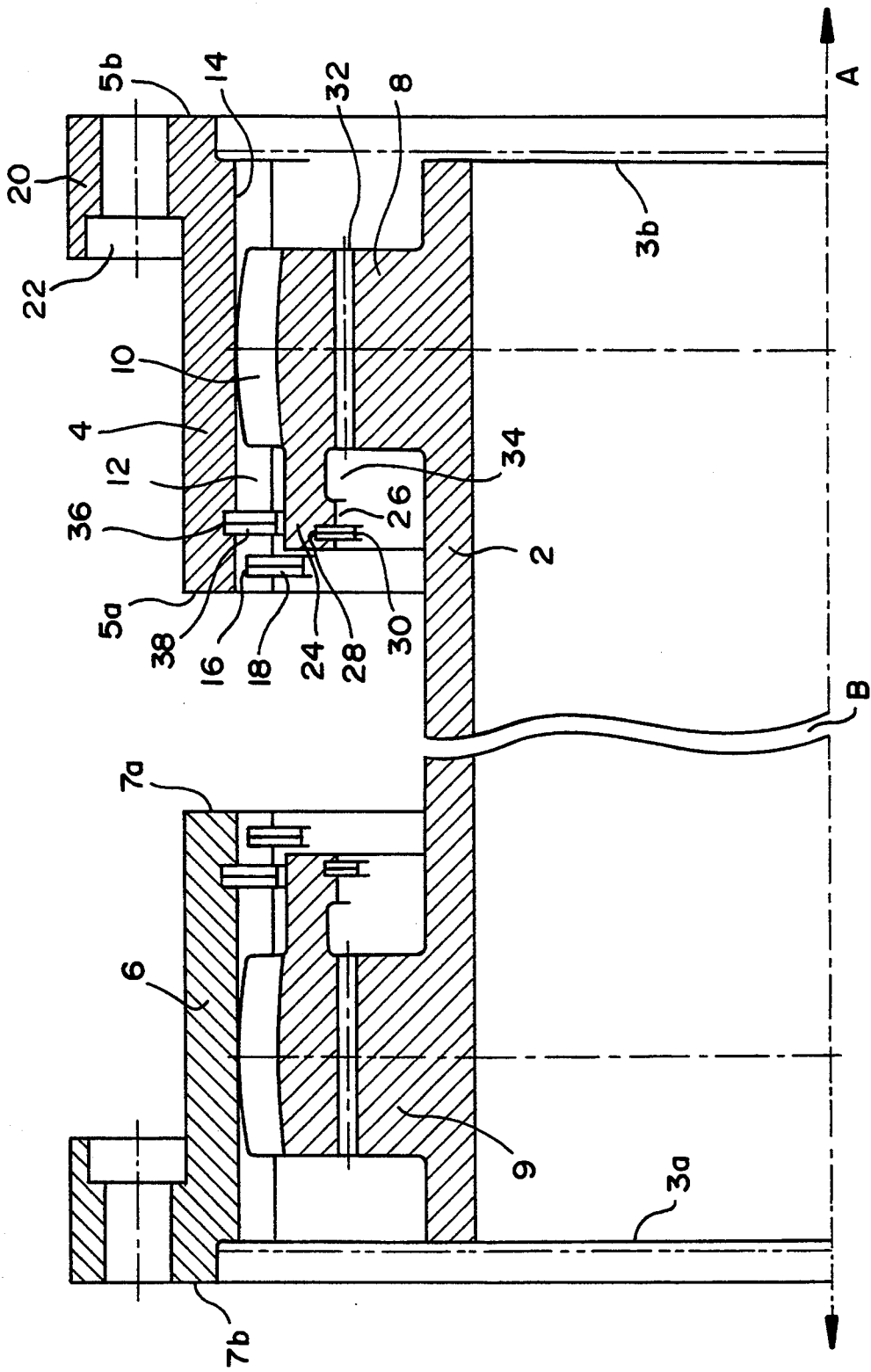
FIG. 1 is a cross-sectional view of an embodiment of the invention in which the coupling allows only very limited relative axial movement.

FIG. 1 is a cross-sectional view showing one half of an axis symmetric coupling according to the present invention which lies above axis line A. The coupling comprises three sleeves, a first sleeve 4, a second sleeve 2 which is sometimes called a spool, and a third sleeve 6. Rotational torque is transferred from the first sleeve 4, to the second sleeve 2, and to the third sleeve 6. In the alternative, rotational torque is transferred from third sleeve 6, to second sleeve 2, and to first sleeve 4.

Each of these sleeves is a tubular member having an axis and ends. Second sleeve 2 has two ends 3a and 3b; first sleeve 4 has two ends 5a and 5b; and third sleeve 6 has two ends 7a and 7b. The three sleeves are shown aligned with one another so that each of their respective axes are commonly aligned along axis A. Because the coupling is symmetic about the break B in the drawing, only one half of the coupling will be described. The other half of the coupling is, in this embodiment, a mirror image of the described half. In order to enable torque to be transferred between sleeves, second sleeve 2 has a radially extending annular portion 8 which terminates in an array of radius teeth of which radius tooth 10 is one. The radius tooth 10 engages a straight tooth 12 which extends radially inwardly from an inside annular surface 14 of the first sleeve 4. The axial extent of the straight teeth is greater than the axial extent of the radius teeth so that the radius teeth can move axially along the straight teeth and remain drivingly engaged with the straight teeth.

Each straight tooth 12 is provided with a first recess 16 which extends in a radial direction away from axis A. In the embodiment shown, this first recess 16 extends only partway into tooth 12. It does not extend to the inside annular surface 14. A pair of retaining rings 18 are shown disposed inside first recess 16. When in place in the first recess 16, these retaining rings 18 extend radially inwardly toward axis A past the inward radial extent of the straight teeth 12. The retaining rings 18 therefore serve to limit movement of the annular portion 8 of the second sleeve 2 in the axial direction. Because second sleeve 2 has two annular portions 8 and 9 each accompanied with a set of retaining rings, movment of the sceond sleeve 2 in one axial direction will be stopped by one of the sets of retaining rings in first sleeve 4 whereas movement of the second sleeve in the opposite axial direction will be stopped by the other set of retaining rings in third sleeve 6.

In order to allow first sleeve 4 to be connected to a shaft, a radial flange portion 20 extends away from the axis A in a radial direction from end 5b of the first sleeve 4. This flange portion 20 is provided with a bore 22 fashioned to accommodate a bolt. Third sleeve 6 is similarly provided with such a flange portion.

In the specific embodiment shown in FIG. 1, the annular portion 8 is provided with a special abutment member 24 which extends from the annular portion 8 in an axial direction toward retaining rings 18. This abutment member 24 has an annular interior surface 26 into which an oil dam recess 28 extends. One or more sets of oil dam rings 30 are disposed in the oil dam recess 28 so that the inward radial extent of the oil dam ring is closer to the axis than is annular interior surface 26 of the abutment member 24. The annular portion 8 of the second sleeve 2 is also provided with at least one through bore 32 through which a lubricant such as oil can pass. When the coupling is rotating, the oil dam ring or rings 30 serve to form a reservoir 34 for oil with annular portion 8 and the annular interior surface 26 of the abutment member 24.

In operation, oil is supplied into reservoir 34 so that it flows through through bore 32. When the oil exits the through bore 32, it is forced by the rotation of the coupling in a radial direction away from axis A and toward the interior annular surface 14 of the first sleeve 4. It then flows back in an axial direction to lubricate the teeth. A second recess 36 is provided in the first sleeve member 4. This second recess 36 extends outwardly in a radial direction all the way through straight teeth 12 and past the inward radial extent of the interior annular surface 14. Inside this second recess 36 is disposed a set of oil rings 38. If a sufficient amount of oil exists in the troughs of the teeth, oil will flow over oil rings 38 and then under retaining rings 18. Oil flow under the retaining rings 38 is possible because the outward radial extent of recess 16 lies, closer to the axis than does the inward radial extent of the interior annular surface 14. Accordingly, a small passage is formed underneath the retaining rings 18 in the trough of each straight tooth 12.

Figure 2:
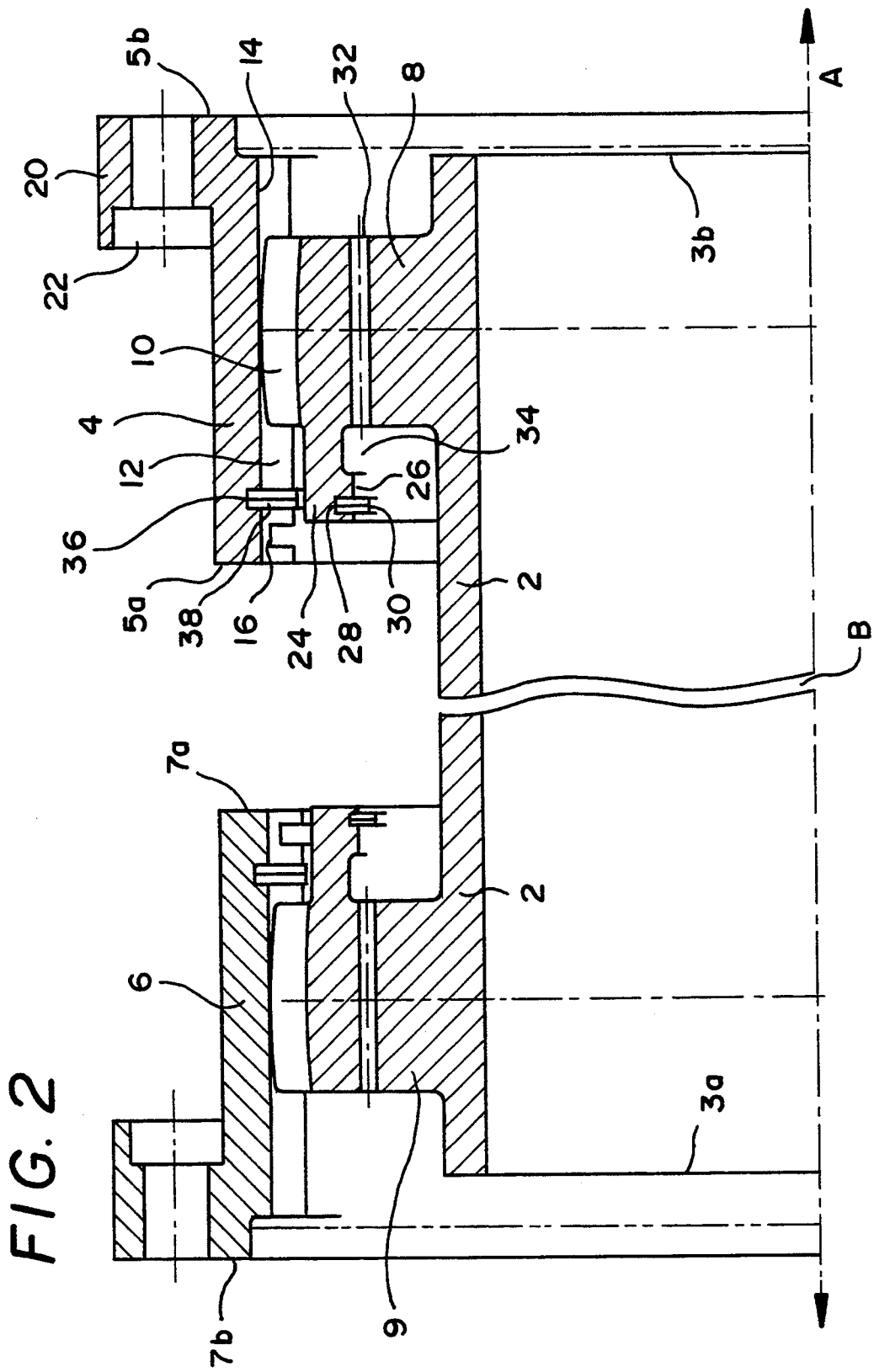
FIG. 2 is a cross-sectional view of the embodiment shown in FIG. 1 in which the retaining rings have been removed to allow for relative axial movement.

FIG. 2 shows the coupling shown in FIG. 1 with the retaining rings removed. Accordingly, the second sleeve 2 is able to shift back and forth in axial direction A over substantially the entire length of teeth 12 of first sleeve 4 without interfering with the ability of the coupling to accomodate axial misalignment such as is provided in U.S. Pat. No. 3,070,979. In the present invention, this feature is provided primarily by the curved surfaces on teeth 10 of sleeve 2.

It will be apparent that the present invention provides a versatile coupling of the type that can accomodate axial misalignment, a greater number of site dimension variations, as well as provide easy adjustment to permit installation in such environments.

I claim:

1. A coupling device, for transmission of torque between a drive and driven shaft, comprising:
    a first sleeve having a longitudinal axis and having an annular portion including an annular interior provided with teeth distributed about said axis on said interior and extending toward said axis, said teeth each extending along said axis and having spaced ends, said interior including opposite ends;
    a second sleeve having a longitudinal axis and an annular portion including an annular exterior provided with teeth distributed about said axis of said second sleeve and spaced apart about said axis of said second sleeve so as to be interengageable with said teeth of said first sleeve;
    said sleeves having relative diameters such that said annular exterior of said second sleeve is insertable into said annular interior of said first sleeve, said teeth of said sleeves each having an axial dimension such that said sleeves are relatively axially shiftable over a selected distance while maintaining said teeth of said sleeves drivingly interengaged;
    said first sleeve having, at one end, a first recess means for supporting a first ring, said first recess means extending radially outwardly from said axis into at least the teeth of said first sleeve, said first ring being carried in said first recess means of said first sleeve and extending radially inwardly;
    said first sleeve having a second recess means supporting a second ring, said second recess means extending radially outwardly from said axis into at least the teeth of said first sleeve and being located adjacent to said first recess means of said first sleeve and extending radially inward by a greater distance toward said axis than said first ring carried by said first recess means, and said second sleeve having an axially extending support means for contacting said second ring so as to prevent relative axial shifting of said sleeves beyond a selected distance.

2. The invention as claimed in claim 1 wherein said annular portion of said second sleeve includes recess means for supporting a flexible ring so as to extend radially inwardly with respect to said axis of said second sleeve.

3. The invention as claimed in claim 1 wherein one of said sleeves is attachable to a drive shaft and the other of said sleeves is attachable to a driven shaft.

4. The invention as claimed in claim 1 wherein the said teeth of one of said sleeves are curved to accommodate axial misalignment between said sleeves in use.

5. The invention as claimed in claim 4 wherein the said teeth of said second sleeve are curved.

6. The invention as claimed in claim 1 wherein said first sleeve is formed with a radial flange having attachment means for attaching a shaft thereto.

7. The invention as claimed in claim 1 wherein said first and second sleeves are symmetric about said respective axes.

8. The invention as claimed in claim 1 wherein said second sleeve is a spool having opposite end portions, each end portion being substantially identical, mirror duplicates of the other end portion of said spool, each end portion including said annular portion, said annular exterior and said teeth, said coupling including a third sleeve with said third sleeve being a substantial identical, mirror duplicate of said first sleeve so as to include said teeth and said first and second rings, said end portions of said spool each including an abutment member positioned to engage a respective second ring to limit axial shifting of said spool and sleeves.

9. The invention as claimed in claim 8 wherein a said annular portion of said second sleeve is a radially extending flange terminating in said teeth, said flange having interiorly of said teeth a through bore and said abutment member includes a ring member extending radially toward said axis to prevent loss of lubricant during use.

10. A coupling device comprising:
    a first rotating sleeve having an annular portion with a longitudinal axis, said annular portion having a first end, a second end, and an annular interior surface, the interior surface being provided with teeth distributed about said axis and extending inwardly toward said axis of the first sleeve, said teeth each extending for a first length along said axis of the first sleeve, said interior surface forming a first recess means adjacent said first end for accommodating a first ring, the first ring being removably disposed in said first recess means and extending inwardly toward said axis of the first sleeve, said interior surface having a second recess means for accommodating a second ring, said second recess means being disposed between said first recess means and said second end, the second ring being removably disposed in said second recess means and extending inwardly farther toward said axis of the first sleeve than said first ring; and
    a second rotating sleeve having an annular portion with a longitudinal axis, said annular portion having two ends and an annular exterior surface, the exterior surface being provided with teeth distributed about said axis of the second sleeve and extending away from said axis of the second sleeve so that the teeth of the second sleeve are interengageable with the teeth of the first sleeve, said first and second sleeves having relative diameters such that said annular portion of the second sleeve is insertable into said annular portion of the first sleeve, said teeth of the second sleeve extending along the axis of the second sleeve for a second length which is substantially smaller than said first length, said second sleeve also having an abutment portion which abuts said first ring of the first sleeve to limit axial movement of the second sleeve, said teeth of the second sleeve being separated from the first ring by an axial distance when the abutment portion abuts said first ring.

11. The coupling of claim 10, wherein said oil dam ring is separated by an axial distance from the teeth of the second sleeve when the abutment portion of the second sleeve abuts said second ring of the first sleeve.

12. A coupling device, for transmission of torque between a drive and a driven shaft, comprising:

a first sleeve having a longitudinal axis and having an annular portion including an annular interior provided with teeth distributed about said axis on said interior and extending toward said axis, said teeth each extending along said axis and having spaced ends, said interior including opposite ends, a third sleeve having a longitudinal axis and having an annular portion including an annular interior provided with teeth distributed about said longitudinal axis on said interior of said third sleeve and extending toward said axis of said third sleeve, said teeth each extending along said axis of said third sleeve and having spaced ends, a second sleeve having a longitudinal axis and spaced apart annular portions each including an annular exterior provided with teeth distributed about said axis of each said annular portion of said second sleeve so as to be respectively interengagable with said teeth of said first sleeve and said third sleeve, said first and third sleeves and said second sleeve having relative diameters such that said annular portions of said second sleeve are insertable into said annular portions of said first and third sleeves, respectively, said teeth of said sleeves each having an axial dimension such that said sleeves are relatively axially shiftable over a first selected distance, said first and third sleeves having at one end a first recess means supporting a first retaining ring, said first recess means extending radially outwardly from said axis into at least the teeth of said first and third sleeves, said first retaining ring being carried in said respective first recess means, said first retaining rings each extending radially inwardly toward said respective axis of said respective first and third sleeves, said teeth of said first and third sleeves each having a second recess means located between said one end and said first recess means thereof, said second recess means having a smaller radial outer extent than said first recess means of each said first and third sleeve and having a second retaining ring carried therein spaced radially inwardly relative to said first retaining ring to thereby define a flow passage between the radial outer extent of said second retaining ring and said interior of said first and third sleeves, respectively, and said second sleeve having an axially extending abutment member on each annular portion for contacting said second retaining ring so as to prevent relative axial shifting of said sleeves beyond a second selected distance, said first selected distance being limited by the contact of the said second sleeve's teeth and the said first retaining ring when the said second retaining ring is removed from the said second recess means of one of said first or third sleeves.

* * * * *